Inventor:
Bernard E. O'Connor

April 17, 1956  B. E. O'CONNOR  2,742,113
INERTIA CONTROLLED FLUTTER DAMPER
Filed March 17, 1952  3 Sheets-Sheet 2
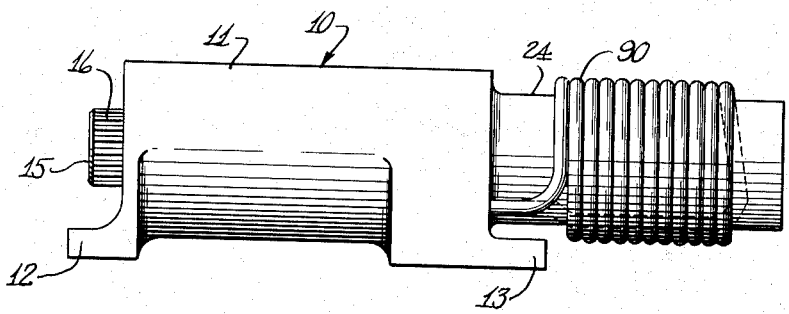
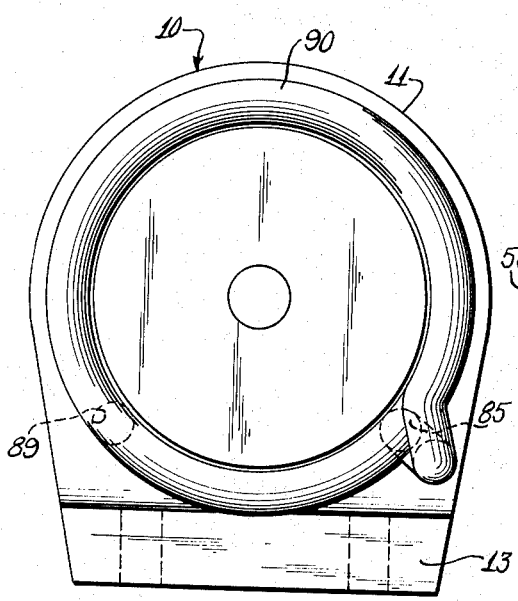
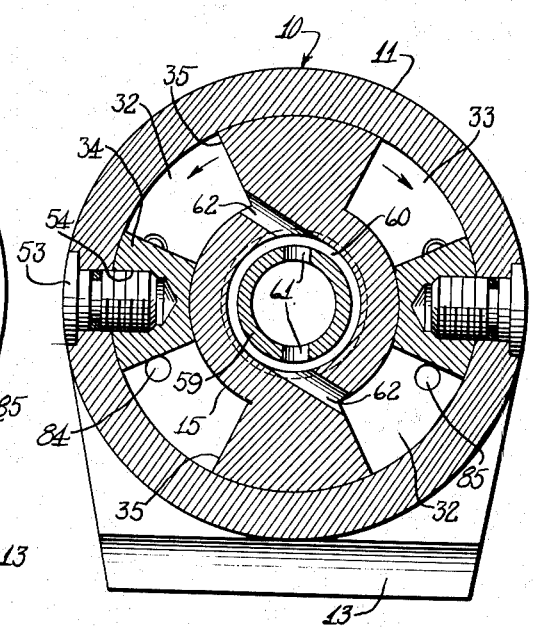
Inventor:
Bernard E. O'Connor April 17, 1956   B. E. O'CONNOR   2,742,113
INERTIA CONTROLLED FLUTTER DAMPER
Filed March 17, 1952   3 Sheets-Sheet 3

Inventor:
Bernard E. O'Connor
by Hill, Sherman, Meroni, Gross & Simpson
Attys

United States Patent Office 2,742,113
Patented Apr. 17, 1956

2,742,113

INERTIA CONTROLLED FLUTTER DAMPER

Bernard E. O'Connor, Buffalo, N. Y., assignor to Houdaille-Hershey Corporation, Detroit, Mich., a corporation of Michigan Application March 17, 1952, Serial No. 276,971

16 Claims. (Cl. 188—93)

This invention relates to improvements in flutter dampers adapted to eliminate the high frequency vibration or flutter of the pivotal adjustable stabilizer and airfoil attachments of aircraft, such as the elevators, ailerons, wing flaps and the like.

A principal object of my invention is to provide a novel and improved form of rotary piston type hydraulic flutter damper structure utilizing the relationship of the inertia of the damping fluid to the overall elasticity of the system including the damping structure and the damping fluid therein, to more efficiently damp flutter than formerly, and arranged with the view toward maintaining the fluid inertia of the system substantially constant.

Another object of my invention is to provide a flutter damper of the rotary vane piston type wherein the elasticity of the damping fluid and parts of the system are compensated for by displacing the fluid through a relatively long inertia passageway and wherein the energy of the fluid is absorbed by a restricted orifice.

Still another object of my invention is to provide a flutter damper of the hydraulic rotary piston type wherein a vane type piston and cylinder move relatively with respect to each other to damp out the vibration of the movable airfoil attachments of aircraft and wherein two restricted orifice valves are contained in the displacement passageways between opposed working chambers, one of which operates to maintain the fluid inertia of the system relatively constant and the other of which controls the resistance to the flow of fluid through the system and acts as an energy absorbing medium.

A still further object of my invention is to provide a flutter damper for aircraft of the rotary piston type having a vane type of piston rotatably mounted within a cylinder having abutments between the vanes of the piston dividing the cylinder into working chambers and so arranged as to provide a substantially constant volume of leakage around the vanes of the piston and abutments of the cylinder regardless of temperature variations, so that the product of the quantity of fluid times its density flowing through the system may be the same throughout a wide range of temperatures.

Still another object of my invention is to provide a novel and improved form of flutter damper of the rotary piston type designed to take into account the damper elasticity and thus maintain the damper of a small compact size suitable for aircraft, and also compensating for leakage around the vanes of the damper and maintaining the effective fluid inertia approximately constant for varying temperature ranges.

A still further object of my invention is to provide a frequency sensitive flutter damper wherein the fluid inertia of the system is maintained substantially constant for varying temperature ranges and wherein the elasticity of the system is compensated for by displacing the fluid through a relatively long inertia passageway.

A further and more detailed object of my invention is to provide a novel and improved form of damper of the rotary piston type in which the fluid inertia passage consists of an elongated tube coiled about the outside of the damper casing.

A still further and more detailed object of my invention is to provide a novel and improved frequency sensitive damper of the rotary piston type having two restricted orifice control valves, one of which serves as a damping compensating valve and the other of which serves as an inertia compensating valve and wherein a length of coiled tubing is connected with the damping compensating valve and provides an inertia passageway compensating for the elasticity of the damping system.

The damper of the present invention operates along the same general principles as are disclosed in my pending application Serial No. 237,937, filed July 21, 1951 and entitled "Frequency Sensitive Mechanical Damping System."

These and other objects of my invention will appear from time to time as the following specification proceeds and with reference to the accompanying drawings wherein:

Figure 2 is a view in side elevation of the damper shown in Figure 1;

Figure 3 is an end view of the damper shown in Figures 1 and 2 looking at the end thereof, which in Figure 2 is the right hand end thereof;

Figure 5 is a cross-sectional view taken substantially along line V—V of Figure 1.

Figure 1:
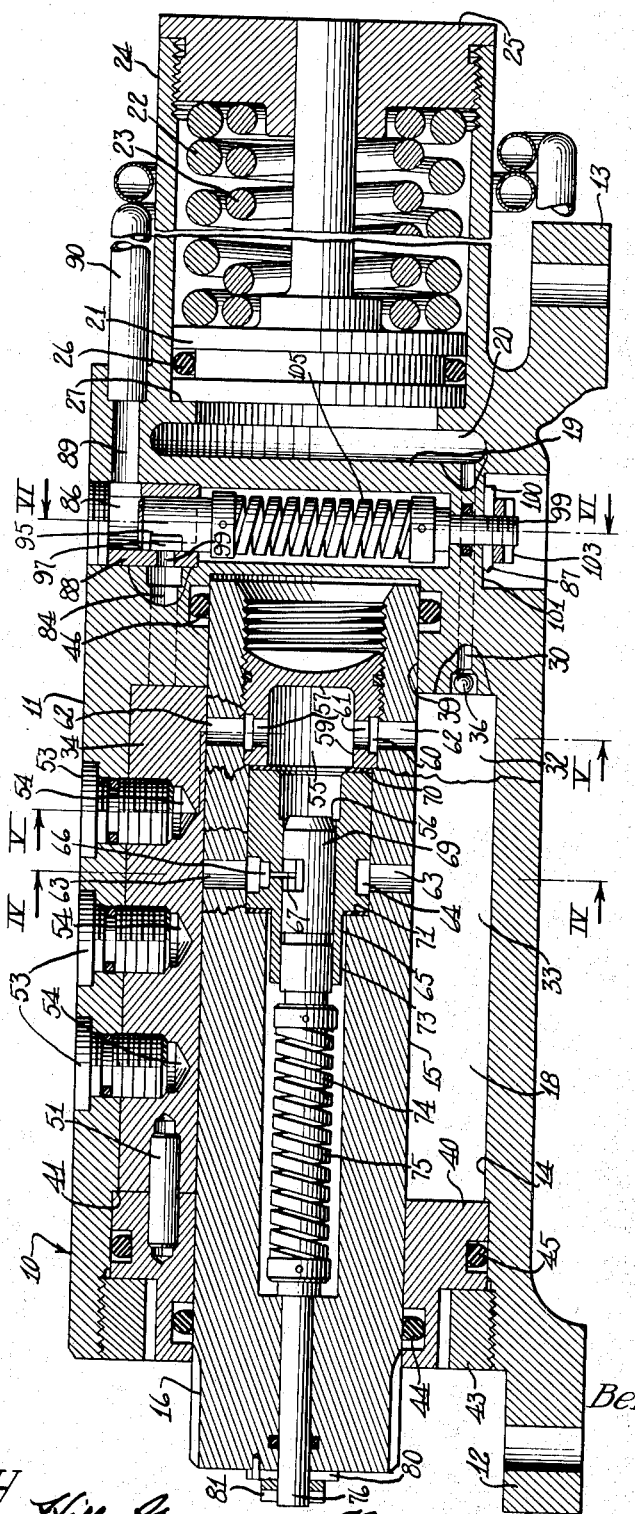
Figure 1 is a schematic longitudinal sectional view taken through a damping structure constructed in accordance with my invention, with certain parts broken away.

In the embodiment of my invention illustrated in the drawings, reference character 10 illustrates generally a flutter damper constructed in accordance with my invention and capable of being contained in free working relation within the front or joint portion of a movable control surface of an airplane airfoil assembly, such as an elevator or wing (not shown) to damp the tendency of the airfoil assembly to flutter.

The flutter damper 10 comprises generally an elongated housing 11, which may be mounted coaxially with the hinge axis of a pivoted airfoil member and may be attached thereto by means of attachment flanges 12 and 13, which may be attached to suitable brackets (not shown) carried interiorly of the movable control member of the airplane. The housing 11 may thus be rigidly secured to the movable control member of the airplane and rocked about the axis of pivotal movement of the control member as the latter swings, or tends to vibrate or flutter.

The flutter damper 10 is shown as being of a rotary vane hydraulic piston type operating on the principle of compensating for the elasticities in the system by an elongated fluid inertia passageway and the absorption of energy by a metered and valved control of the displacement of hydraulic fluid between opposed working chambers, and permitting relatively free intentional movement of the control structure, but resisting vibrational or sudden or rapid movements of the control structure.

The housing 11 is provided with an interior cylindrical wall 14 defining a cylindrical chamber 18 within which is mounted a rotary vane piston, or wing shaft 15. The rotary vane piston 15 has a splined or serrated outer end portion 16 serving as a means for attachment to a corresponding internally splined or serrated attachment (not shown) adapted to be attached to a stationary portion of the airfoil member. The wing shaft or rotary piston 15 is thus stationary while the housing 11 is rotatably movable about said wing shaft in accordance with the movements of the movable airfoil member. It is, of course, obvious that the arrangement may be reversed and the housing 11 may be stationary while the rotary piston may be movable with respect to said housing.

The housing 11 has an intermediate transverse wall 19 at the end of the chamber 18. The intermediate wall 19 forms an end wall of a fluid replenishing chamber 20 extending from the chamber 18 in axial alignment therewith. The replenishing chamber 20 is shown as having a piston 21 movable therein and biased toward the wall 19 by a pair of concentrically loaded compression springs 22 and 23 contained within a cylindrical extension 24 of said housing and seated at their outer ends against an end closure plug 25 for said extension. An O-ring 26 is shown as being recessed between the ends of the piston 21 to prevent the leakage of fluid thereby. Said piston is shown as abutting an annular shoulder 27 at the end of its replenishing stroke.

Hydraulic fluid may be introduced into the damper 10 and replenishing chamber 20 through a suitable passageway (not shown) and through a check valve structure as in application Serial No. 209,444, filed February 5, 1951 as a joint invention with Benjamin Fuente and no part of my present invention so not herein shown or described. The replenishing passageway may be tightly closed during operation of the damper to prevent the leakage of fluid therefrom.

Axial passageways 30, 30 lead from the replenishing chamber 20 to opposed working chambers 32 and 33. The working chambers 32 and 33 are separated from each other by reaction dividers 34, 34 and the adjacent edges of vanes or wings 35, 35 of the wing shaft 15, as will hereinafter be more clearly described as this specification proceeds. Check valves 36, 36 are provided in the passageways 30, 30 to prevent the back flow of fluid into the replenishing chamber 20 during operation of the damper.

The rotary vane piston or wing shaft 15 is shown as being rotatably mounted at its inner end within a reduced diameter inner end portion 39 of the chamber 18. Said rotary vane piston is also rotatably mounted at its outer end within an outer end block 40 for the housing 11. The end block 40 is shown as held in engagement with a shoulder 41 of the cylindrical wall 14 by an externally threaded ring nut 43. O-rings 44 and 45, respectively, are shown as being recessed within the inner and outer peripheries of the end block 40 and as engaging the wing shaft 15 and cylindrical wall 14, to prevent the leakage of fluid thereby. The inner end of the wing shaft 15 is shown as being sealed to the inner wall of the reduced diameter portion 39 of the chamber 18 by an O-ring 46.

The wings 35, 35 of the wing shaft 15 are shown as being diametrically opposed and as conforming to and slidably engaging the cylindrical wall 14 at their outer peripheries. The fluid reaction members or dividers 34, 34 are shown as conforming to the inner periphery of the cylindrical wall 14 and as slidably engaging the cylindrical surface of the wing shaft 15 between the wings 35, 35 thereof at their inner peripheries. Said fluid reaction dividers are shown as being located in diametrically opposed relationship by locating pins 51 mounted in one end thereof and registering with corresponding apertured portions formed in the inner end of the end block 40. Other locating pins (not shown) may register with suitable apertured portions formed in the intermediate wall 19 and the opposite ends of fluid reaction dividers 34, 34. The fluid reaction dividers 34, 34 with the wings 35, 35 thus divide the chamber 18 into the complemental varying volume working chambers 32, 32 operating in opposed relationship to complemental varying volume working chambers 33, 33.

The working pressures within the working chambers 32, 32 and 33, 33 are so great that the fluid reaction dividers 34, 34 have a tendency to flex transversely of their longitudinal axes, resulting in a distortion of the dampening effect and providing an undesirable elasticity within the working chambers of the damper. This tendency of the dividers 34, 34 to flex laterally is herein shown as being avoided by three longitudinally spaced large diameter threaded plugs 53, 53, threaded through the outer wall of the housing 11 from the outer side thereof and having threaded engagement with drilled and threaded holes 54, 54 in the dividers 34, 34. One plug 53 is shown as being located at the transverse center of the divider 34 and the other two plugs are shown as being spaced outwardly therefrom on opposite sides thereof and inwardly of the ends of the chamber 18. The spacing of the plugs 53, 53 is such as to cooperate with the locating pins 51, 51 and hold the dividers 34, 34 from lateral flexing at a plurality of points, and assure sufficient rigidity thereof to have substantially no elasticity when subjected to heavy operating stresses.

The wing shaft 15 is herein shown as having a central fluid displacement chamber 55 of a relatively large diameter. The chamber 55 extends inwardly from the inner end of the wing shaft 15 and is disposed axially of said shaft and communicates with an aligned valve chamber 56 of a slightly smaller diameter, and shown as being concentric with said fluid displacement chamber.

A closure plug 57 having an inwardly extending annular wall 59 is shown as being threaded in the outer end of the fluid displacement chamber 55. The annular wall 59 is shown as having an annular fluid passageway 60 formed in the periphery thereof and communicating with radial passageways 61, 61 leading to said annular passageway from the displacement chamber 55. The annular passageway 60 registers with radial fluid passageways 62, 62 leading outwardly through the wing shaft 15 and communicating with the working chambers 32, 32 as shown in Figure 5. It should here be noted that the displacement passageways 62, 62 lead through the wing shaft 15 into the working chambers 32, 32 adjacent the wings 35, 35 of the wing shaft 15 and extend partially along the walls thereof so as to remain open during all conditions of relative movement of the housing 11 with respect to the wing shaft 15 (see Figure 5).

The displacement chambers 33, 33 communicate with the valve chamber 56 and the displacement chamber 55 through displacement passageways 63, 63 leading through the wing shaft 15 at the inner edges of the wings thereof and communicating with the valve chamber 56 through an annular passageway 64 formed in an orifice body 65 for an orifice control valve 69. The orifice body 65 has a chordal passageway 66 therein communicating with a chordal slit 67 formed in orifice control valve 69. The orifice control valve 69 serves as an inertia compensating valve and maintains the leakage around the wings or fluid reaction dividers 35, 35 of the damper substantially constant for varying temperatures of the fluid, so as to maintain the effective fluid inertia substantially constant during all temperature conditions, as will hereinafter more clearly appear as this specification proceeds.

The orifice body 65 is held in engagement with the inner end of the valve chamber 56 by the closure plug 57. The plug 57 engages a packing member or gasket 70 interposed between the end of said closure plug and the adjacent end of said orifice body. A similar gasket 71 is interposed between the orifice body 65 and the inner end of the valve chamber 56. The orifice body 65 is herein shown as having a sleeve portion 73 extending inwardly of the valve chamber 56 and along an aligned reduced diameter chamber 74 for a short portion of the length thereof. The chamber 74 contains a spiral bimetal thermostatic element 75, through which the orifice control valve 69 is operated, and which varies the setting of said orifice control valve as the temperatures to which the flutter damper is subjected vary, as will now be described.

The orifice control valve 69 is like the orifice control valve shown in the aforementioned application, Serial No. 209,444, and is of a generally cylindrical form having a hollow interior portion opening into the displacement chamber 55 and communicating with the chordal slit 67. Said orifice control valve is turned within the orifice body 65 from the exterior of the wing shaft 15 by means of a rod 76 extending through the wing shaft 15 from the outer end thereof into the chamber 74. The rod 76 is secured at its inner end to one end of the bimetal thermostatic element 75. The other end of the bimetal thermostatic element 75 is secured to the orifice control valve 69 to turn said valve upon turning of the rod 76 and upon changes in temperature. A rectangular pin 80 is shown as extending through the outer end of the rod 76 and as abutting the outer end face of the wing shaft 15. The end of said pin may be pointed and may serve as a pointer and cooperate with indicia (not shown) which may be on the outer face of the wing shaft 15, to enable the position of the orifice control valve 69 to readily be determined. A slotted annular nut 81 is shown as being threaded on the outer end of the rod 76 into engagement with the rectangular pin 80, to afford a means for turning said rod and the orifice control valve through the thermostatic element 75.

The orifice control valve 69 is thus adjustably moved through the spiral thermostatic element 75, and said thermostatic element affords a means for compensating for variations in temperatures encountered in the service of the flutter damper in an airplane. The spiral bimetal thermostatic element 75 may thus move said orifice control valve to restrict or open the orifice thereof from a temperature rated adjustment, to compensate for changes in viscosity of the damping fluid as the temperature changes and to provide sufficient reaction against the fluid passing through said orifice control valve to increase or decrease the damper leakage around the reaction dividers and vanes or wings of the wing shaft as the temperature varies so as to provide a substantially constant leakage and effective fluid inertia in the system for a wide range of temperature conditions.

Figure 4:
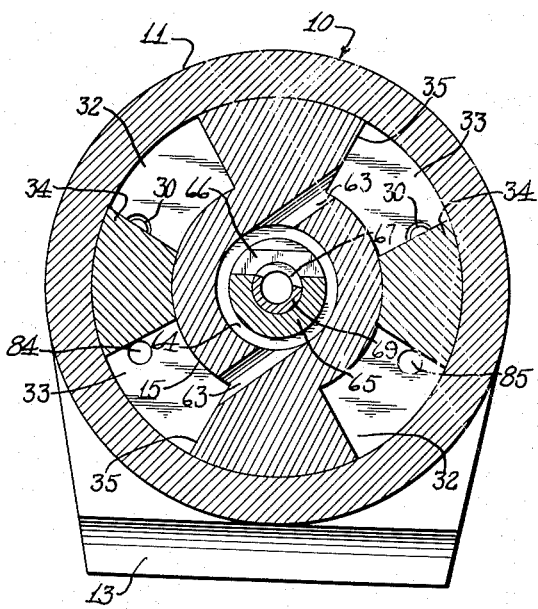
Figure 4 is a cross-sectional view taken substantially along line IV—IV of Figure 1.
Figure 6:
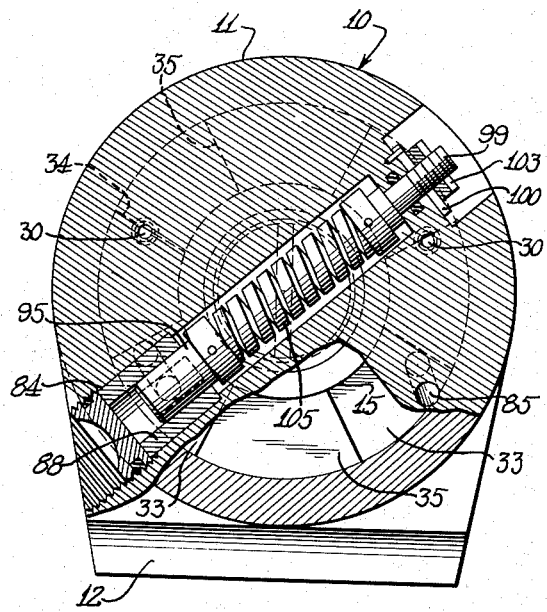
Figure 6 is a fragmentary cross-sectional view taken substantially along line VI—VI of Figure 1 showing certain parts broken away.

The intermediate wall 19 is shown in Figures 1, 4, 5 and 6 as having two angularly disposed fluid displacement passageways 84 and 85 leading therethrough. The passageway 84 communicates with a valve chamber 86 extending through said intermediate wall at right angles to the wing shaft 15. The passageway 84 is shown as leading from a displacement chamber 33 and as having communication with an orifice body 88 for an orifice control valve 95. The orifice body 88 is shown as being mounted adjacent one end of the valve chamber 86. A passageway 89 leads from the orifice body 88 and valve chamber 86 and has communication with one end of a spiral tube 90. The spiral tube 90 is coiled about the outside of the cylindrical wall 24 of the replenishing chamber 20. The spiral tube 90 is coiled about the wall 24 to have a relatively great effective length compared to the length of said wall. The opposite end of said tube from the passageway 89 is connected with the passageway 85 communicating with a displacement chamber 32 opposing the displacement chamber 33. The coil 90 thus forms a relatively long inertia passage compensating for the elasticity of the damping structure and fluid.

The orifice control valve 95 is mounted in the orifice body 88 for rotational movement with respect thereto to vary the cross-sectional area of the restricted orifice. Said orifice control valve is a damping compensating valve and serves to control the resistance to the flow of the damping fluid and acts as an energy absorbing means in much the same manner as the orifice control valve in my joint application with Benjamin Fuente, Serial No. 209,444.

The damping compensating valve 95 is shown as being a generally cylindrical valve body drilled from its outer or discharge end to form a chamber therein in communication with the valve chamber 86 and passageway 89. Said valve is likewise provided with a chordal slot 97 communicating with a passageway 99 extending through the orifice body 88.

The valve 95 is shown as being operated by a rod 99 extending outwardly through the housing 11 and having a rectangular pin 100 passing therethrough and abutting a recessed outer wall portion 101 of said housing. A slotted annular nut 103 is threaded on the outer end of the rod 99 into engagement with the pin 100 and forms a means for turning said rod to adjust the valve through a bimetallic thermostatic element 105. The wall 101 may have indicia thereon to indicate the manual setting of the valve.

The bimetallic thermostatic element 105 is herein shown as being of a spiral form like the element 75, and is secured at one of its ends to the inner end of the rod 99 and at its opposite end to the body of the valve 95 for turning said valve and changing the restriction offered thereby upon variations in temperature, or upon turning movement of the rod 99 manually.

The valve 95 may thus be pivotally adjusted in accordance with the desired setting thereof to provide the required resistance to the flow of fluid and serve as an energy absorbing medium and cooperating with the elongated displacement inertia passage 90 compensating for the elasticity of the fluid within the system.

Since the damper is designed to offer damping resistance to high frequency oscillation, in operation of the damper when in place on an airfoil member of an aircraft, the airfoil member may readily be adjusted with very little resistance offered by the damper. Upon the tendency for the airfoil member to vibrate or flutter however, the damping mechanism including the inertia compensating valve 69 and the damping compensating valve 95 cooperating with the elasticity compensating fluid inertia passageway 90 will come into operation and damp vibrational movement thereof, it being understood that the damper is always effective to damp vibration of high frequency oscillation during as well as after adjustment of the airfoil member.

It may further be seen that during high frequency oscillating movement of the housing 11 about the wing shaft 15, that the damping fluid will be displaced from one working chamber 33 of decreasing volume through the damping compensating valve 95 and the elongated spiral inertia passageway 90 into a working chamber 32 of increasing volume and vice versa as the direction of movement of the wing shaft reverses and that the damping compensating valve 95 will control the resistance to the flow of fluid to the required extent for efficient damping and will act as an energy absorbing medium therefor while the elongated inertia passageway 90 will compensate for the overall elasticity of the system in either direction of movement of said wing shaft.

It should here be understood that since fluid leaks around the wings 35, 35 and reaction dividers 34, 34, this fluid will not pass through the damping compensating valve and elongated inertia coil. Since the volume of this leakage would ordinarily be a maximum at the high temperatures encountered and a minimum at the lower temperatures encountered without a means for compensating for the changes in temperature, the inertia compensating valve 69 is provided to adjust itself upon temperature changes and to provide a substantially constant leakage around the wings and reaction dividers regardless of temperature variations, so that the product of the quantity of fluid times its density flowing through the inertia coil 90 will be the same through a wide range of temperatures.

It will be understood that modifications and variations may be effected without departing from the scope of the novel concepts of the present invention.

I claim as my invention:

1. A flutter damper of the character described comprising an elongated housing having an inner wall defining a cylindrical chamber, a rotary piston pivotally mounted in said chamber, a fluid reaction member extending inwardly from said inner wall and having slidable engagement with said rotary piston, said piston dividing said chamber into a plurality of working chambers, one of which is opposed to the other, a thermally operated variable restricted orifice inertia compensating valve connected between opposed working chambers for maintaining leakage past said piston substantially uniform regardless of temperature variations, a variable restricted orifice damping compensating valve connected with one working chamber, and passageway means of greater length than the distance between opposed working chambers connecting said damping compensating valve with the other opposed working chamber independently of said inertia compensating valve.

2. A flutter damper of the character described comprising an elongated housing having an inner wall defining a cylindrical chamber, a rotary piston mounted in said chamber, a fluid reaction member extending inwardly from said inner wall and having slidable engagement with said piston and with said piston dividing said chamber into a plurality of working chambers, one of which is opposed to the other, a variable restricted orifice inertia compensating valve connected between opposed working chambers for maintaining the leakage past said piston substantially uniform regardless of temperature variations, a variable restricted orifice damping compensating valve having an elongated inertia passageway connected thereto, said damping compensating valve and said inertia passageway being connected between opposed working chambers independently of said inertia compensating valve and said inertia compensating passageway being in the form of a coil to obtain a greater length than the distance between opposed working chambers.

3. A flutter damper of the character described comprising an elongated housing having an inner wall defining a cylindrical chamber, a rotary piston mounted in said chamber, and having a vane slidably engaging said inner wall, fluid reaction dividers extending inwardly from said inner wall and having slidable engagement with said piston, and with said vane dividing said chamber into a plurality of working chambers one of which is opposed to the other, a variable orifice damping compensating valve connected between two opposed working chambers, a variable restricted orifice inertia compensating valve connected between other opposed working chambers independently of said damping compensating valve, the connection between said inertia compensating valve and said two other opposed working chambers including a passageway member of greater length than the distance between said two other opposed working chambers and a bi-metal thermal responsive element having operative connection with said second mentioned valve for operating said valve upon variations in temperature and maintaining the leakage of fluid past said piston substantially constant regardless of temperature variations.

4. In a frequency sensitive mechanical vibration dampener, a housing having a piston chamber therein, a rotary piston operable in said chamber, said chamber having pressure reacting members therein cooperating with said rotary piston and with said piston defining a plurality of working chambers of increasing and decreasing volume in accordance with oscillating movement between said housing and piston, displacement passages leading from the chambers of decreasing volume to those of increasing volume, an energy absorbing restricted orifice valve connected with one of said displacement passages and an elongated coiled fluid inertia passage connected with said valve and connecting said valve with another of said displacement passages.

5. In a flutter damper of the character described, a housing having a cylindrical chamber therein, an elongated rotary piston within said chamber, said chamber having fluid reaction members therein extending into slidable engagement with said rotary piston and cooperating therewith and dividing said chamber into a plurality of complemental and opposed working chambers, a displacement port leading from one of said working chambers, a damping compensating valve communicating with said displacement port and controlling the resistance to the flow of fluid from said port and acting as an energy absorbing means affording vibration damping resistance control upon the displacement of fluid therethrough, a displacement port leading from another working chamber opposed to said one working chamber, and an elongated inertia passageway encircling said housing and connected from said valve to said other displacement port.

6. A flutter damper of the character described comprising an elongated housing having an inner wall defining a cylindrical chamber, a rotary piston within said chamber having a wing slidably engaging said inner wall of said housing, a fluid reaction member within said inner wall and having slidable engagement with said wing shaft, the spaces between said fluid reaction member and said wing defining a plurality of varying volume working chambers, a displacement port leading from one of said working chambers, a second displacement port leading from an opposed working chamber, energy absorbing means comprising a variable restricted orifice valve connected with said displacement port, and an elongated inertia passageway member of a length substantially greater than the distance between said first and second displacement ports connecting said valve and with the second of said displacement ports, other displacement ports leading from said working chambers, and a restricted orifice inertia compensating valve connecting said displacement ports together.

7. In combination in a frequency sensitive mechanical vibration damper, a housing having a cylindrical chamber therein, a rotary piston operable in said chamber and having wings slidably engaging the wall thereof, a plurality of fluid reaction members within the wall of said chamber and rigidly mounted therein in the spaces between the wings of said wing shaft and having slidable engagement with said wing shaft, the spaces between said reaction members and the wings of said wing shaft defining complemental and opposed working chambers, displacement passages leading from certain of said working chambers having energy absorbing means and coiled inertia passageway means connected thereto to absorb the energy of the damping fluid and compensate for the elasticity in the damper during high frequency vibration thereof, other passageways leading from certain of said working chambers, inertia compensating restricted orifice valve means connected with said other passageways, and a temperature responsive member connected with said valve means and maintaining the damping leakage substantially constant throughout a wide range of temperatures.

8. A flutter damper of the character described comprising an elongated housing having an inner wall defining a cylindrical chamber, a rotary piston pivotally mounted within said chamber, a plurality of fluid reaction members extending inwardly from said inner wall and having slidable engagement with said rotary piston and with said piston dividing said chamber into a plurality of pairs of diametrically opposed varying volume working chambers, one pair of which decreases in volume as the other pair increases, a temperature responsive variable restricted orifice inertia compensating valve connected at one of its ends with one pair of said working chambers and connected at its other end to another pair of said working chambers for maintaining the leakage past said piston substantially uniform regardless of temperature variations, a temperature responsive variable restricted orifice damping compensating valve connected with one of said working chambers and a spiral elongated elasticity compensating inertia passageway connecting said damping compensating valve with an opposed working chamber.

9. A flutter damper of the character described comprising an elongated housing adapted for attachment to the inside of a pivotally mounted airfoil assembly and having an inner wall defining a cylindrical chamber, a rotary piston within said chamber and adapted for attachment to a stationary part of the airfoil assembly, a plurality of fluid reaction dividers within said inner wall and rigidly mounted within said housing and having slidable engagement with said rotary piston, and with said piston dividing said cylindrical chamber into a plurality of varying volume working chambers, some of which are opposed to the others, a variable orifice damping compensating valve connected with one of said working chambers, an exteriorly coiled elongated elasticity compensating inertia passageway connecting said damping compensating valve with another of said working chambers operating in opposed relation with respect to said one working chamber, a variable restricted orifice inertia compensating valve connecting said working chambers together, and a thermal responsive element operatively connected with said inertia compensating valve for varying the restriction of the orifice thereof upon variations in temperature and maintaining leakage by said piston substantially uniform regardless of temperature variations.

10. A flutter damper of the character described comprising an elongated housing having an inner wall defining a cylindrical chamber, a rotary piston within said chamber, a plurality of fluid reaction dividers rigidly mounted in said chamber and extending inwardly from said inner wall into slidable engagement with said piston, said dividers and piston dividing said chamber into a plurality of pairs of varying volume working chambers of increasing and decreasing volume, a variable restricted orifice inertia compensating valve connected from the chambers of decreasing volume to those of increasing volume, a thermal responsive element operatively connected with said valve for varying the restriction thereof upon temperature variations and maintaining a substantially uniform leakage of fluid past said piston from one working chamber to the other regardless of temperature variations, a variable orifice damping compensating valve connected with one of said working chambers independently of said inertia compensating valve and means forming an elongated inertia passageway and connecting said damping compensating valve with another working chamber opposed to said one working chamber and of a substantially greater length than the distance between said working chambers.

11. A flutter damper of the character described comprising an elongated housing having an inner wall defining a cylindrical chamber, a rotary piston within said chamber, a plurality of fluid reaction dividers mounted within said chamber and extending inwardly from said inner wall into slidable engagement with said piston, said dividers and said piston dividing said chamber into a plurality of pairs of opposed varying volume working chambers, a variable restricted orifice inertia compensating valve connecting the chambers of decreasing volume with the chambers of increasing volume, means for operating said valve including a thermal responsive element operatively connected thereto and varying the restriction thereof upon variations in temperature to maintain a substantially uniform leakage of fluid past said piston regardless of temperature variations, a variable orifice damping compensating valve connected with one of said working chambers, means for operating said valve including a thermal responsive element operatively connected thereto and varying the restriction thereof upon variations in temperature, and an elongated inertia passageway connecting said damping compensating valve with another working chamber opposed to said one working chamber and comprising an elongated tube coiled about the outside of said housing.

12. A flutter damper of the character described comprising an elongated housing, said housing having an inner wall defining a cylindrical chamber, a wing shaft in said chamber having wings slidably engaging said inner wall and forming a rotatable piston, a plurality of fluid reaction members extending inwardly from said inner wall and rigidly mounted within said housing in the spaces between the wings of said wing shaft and having slidable engagement with said wing shaft at their inner ends, the spaces between said reaction members and the wings of said wing shaft defining a plurality of complemental working chambers certain of which operate in opposed relation to the others, displacement ports connecting certain of said complemental working chambers together, a variable restricted orifice inertia compensating valve connecting said displacement ports with opposed complemental working chambers, other displacement ports leading from two opposed working chambers, energy absorbing means connected with one of said ports and including a variable restricted orifice valve affording vibration damping resistance control upon the displacement of fluid therethrough, and an elongated inertia coil connected from said valve to the other of said other displacement ports to compensate for the elasticity in the damper during high frequency vibrations and thereby assure damping control movement of fluid through said energy absorbing means.

13. A flutter damper of the character described comprising an elongated housing, said housing having an inner wall defining a cylindrical chamber, rotary piston rotatably mounted in said chamber and having a plurality of vanes slidably engaging said inner wall, a plurality of fluid reaction members extending inwardly from said inner wall and rigidly mounted within said housing in the spaces between the vanes of said piston and having slidable engagement with said piston, the spaces between said reaction members and said vanes defining a plurality of pairs of complemental varying volume working chambers, one pair of which operates in opposed relation to another pair, displacement ports connecting certain of said complemental working chambers together, other displacement ports connecting certain other of said working chambers together, a variable restricted orifice inertia compensating valve connecting said displacement ports of said opposed complemental working chambers together, a thermal responsive element operatively connected with said fluid inertia compensating valve for varying the restriction offered thereby upon temperature variations to maintain the leakage of fluid past said piston substantially uniform regardless of temperature variations, other displacement ports leading from certain opposed working chambers, a variable restricted orifice damping energy absorbing compensating valve connected with one of said other displacement ports, means for operating said valve, and an elongated inertia coil connected from said valve to another of said other displacement ports to compensate for the elasticity in the damper during high frequency vibration and thereby assure damping control movement of the energy absorbing means.

14. A flutter damper of the character described comprising an elongated housing, said housing having an inner wall defining a cylindrical chamber, a rotary piston in said chamber having vanes slidably engaging said inner wall, a plurality of fluid reaction members extending inwardly from said inner wall and rigidly mounted within said housing in the spaces between the vanes of said piston and having slidable engagement with said piston at their inner ends, the spaces between said reaction members and vanes defining a plurality of pairs of complemental working chambers certain of which operate in opposed relation to the others, displacement ports connecting one pair of said complemental working chambers together, other displacement ports connecting another pair of said complemental working chambers together, a variable restricted orifice inertia compensating valve connected with said displacement ports and connecting said opposed pairs of complemental working chambers together, means for operating said valve including a thermal responsive element connected thereto and operable to change the position of said valve and the restriction afforded thereby upon temperature variations to maintain a uniform leakage past said piston throughout a wide range of temperature variations, an energy absorbing medium comprising a variable restricted orifice control valve connected with one of said working chambers, means for operating said valve including a thermal responsive element connected thereto and operable to change the position thereof upon variations in temperature, and elongated inertia passageway means connected from said last mentioned valve to another of said working chambers opposed to said one working chamber and being of a greater length than the distance between said working chambers to compensate for the elasticity of the damper during high frequency vibration and thereby assuring damper control movement of fluid through said energy absorbing medium.

15. In a frequency-sensitive mechanical vibration dampener, a housing having a piston chamber therein, a rotary piston operable in said chamber, said chamber having opposed pressure reacting members therein cooperating with said rotary piston, and with said piston defining a plurality of pairs of working chambers of increasing and decreasing volume in accordance with oscillating movement between said housing and said piston, displacement passages leading from the chambers of decreasing volume to those of increasing volume, a variable restrictive orifice inertia compensating valve connected in one of said displacement passages and an elongated coiled fluid inertia passageway connected in another of said displacement passages.

16. In a flutter damper of the character described, a housing having a cylindrical chamber therein, an elongated rotary piston within said chamber, said chamber having two diametrically opposed fluid reaction members therein extending into slidable engagement with said rotary piston and cooperating therewith and dividing said chamber into a plurality of complemental and opposed working chambers, a displacement port leading from one of said working chambers, an inertia compensating valve communicating with said displacement port and connected with an opposed working chamber for maintaining leakage past said piston substantially uniform regardless of temperature variations, a displacement port leading from another working chamber and an elongated inertia passageway encircling said housing and connected with said last mentioned working chamber and with another opposed working chamber to compensate for the elasticities in the system.

References Cited in the file of this patent

UNITED STATES PATENTS

| | | |
|---|---|---|
| 1,876,863 | Cross | Sept. 13, 1932 |
| 2,037,819 | Peo | Apr. 21, 1936 |
| 2,038,596 | Peo | Apr. 28, 1936 |
| 2,184,190 | Krauss | Dec. 19, 1939 |

FOREIGN PATENTS

| | | |
|---|---|---|
| 546,236 | France | Aug. 17, 1922 |